April 29, 1969  L. J. K. VAN OPIJNEN  3,441,839
POWER SUPPLY FOR VACUUM PUMP WITH AUXILIARY
PRESSURE MEASUREMENT FUNCTION
Filed Nov. 22, 1966

3,441,839
POWER SUPPLY FOR VACUUM PUMP WITH AUXILIARY PRESSURE MEASUREMENT FUNCTION
Leendert J. K. van Opijnen, Needham, Mass., assignor to National Research Corporation, Newton Highlands, Mass., a corporation of Massachusetts
Filed Nov. 22, 1966, Ser. No. 596,152
Int. Cl. G01n 27/62
U.S. Cl. 324—33    6 Claims

ABSTRACT OF THE DISCLOSURE

An improvement in electrical power supply circuitry for oscillating electron types of vacuum pumps (e.g., orbitrons) is described. The improvement comprises an electrically floating portion of the power supply with a microammeter and a special rectifying circuit mounted in the floating portion of the power supply to separate ion, electron and X-ray derived currents derived from the pump. This allows the microammeter to measure an ion current which varies as a linear function of pressure down to $10^{-7}$ torr and below, thus providing an inexpensive gauging function as a supplement to the principal function (e.g., pumping) of the old apparatus.

REFERENCES

Buckley, Patent 1,372,798, Mar. 29, 1921; Dushman, Patent 1,334,143, Sept. 27, 1918; Herb, Patent 2,850,225, Sept. 2, 1958; Hall, Helmer and Jepsen, Patent 2,993,638, July 25, 1961; Herb and Pauly, Patent 3,244,969, Apr. 5, 1966.

DESCRIPTION

The present invention relates to oscillating electron types of vacuum pumps of the type described in the Herb and Herb and Pauly references, the specific pump of the latter reference being known in the art as the orbitron. It has been a problem in the art to provide an auxiliary pressure measuring function for orbitron pumps and the like. But, thus far, the art has not achieved a good solution to this problem. Some of the solutions which have been attempted are: (1) adding a separate ionization gauge to the system being pumped (these gauges, per se, were discovered by Buckley and Dushman); (2) running the pump itself as a gauge with the wall or an added electrode as current collector (Herb and Pauly); (3) measuring current drawn through the pump power supply (Hall, Helmer and Jepsen). Solutions (1) and (2) involve expense and complexity and may present a safety hazard if the pump wall is used as current collector in (2). Solution (3) while suitable for sputter-ion pumps is not suitable for orbitron pumps or the like because the degree of sputtering and current drawn are too low in the latter.

It is therefore the object of the invention to provide apparatus for providing an auxiliary pressure measuring function in orbitron pumps, at low cost, without safety hazard and affording a high signal current which varies linearly with pressure from the starting pressure of the pump down to the critically important operating range of $10^{-7}$ torr (mm. Hg/absolute).

The object is realized through the present invention, which is described generally in the foregoing abstract.

Figure 1:
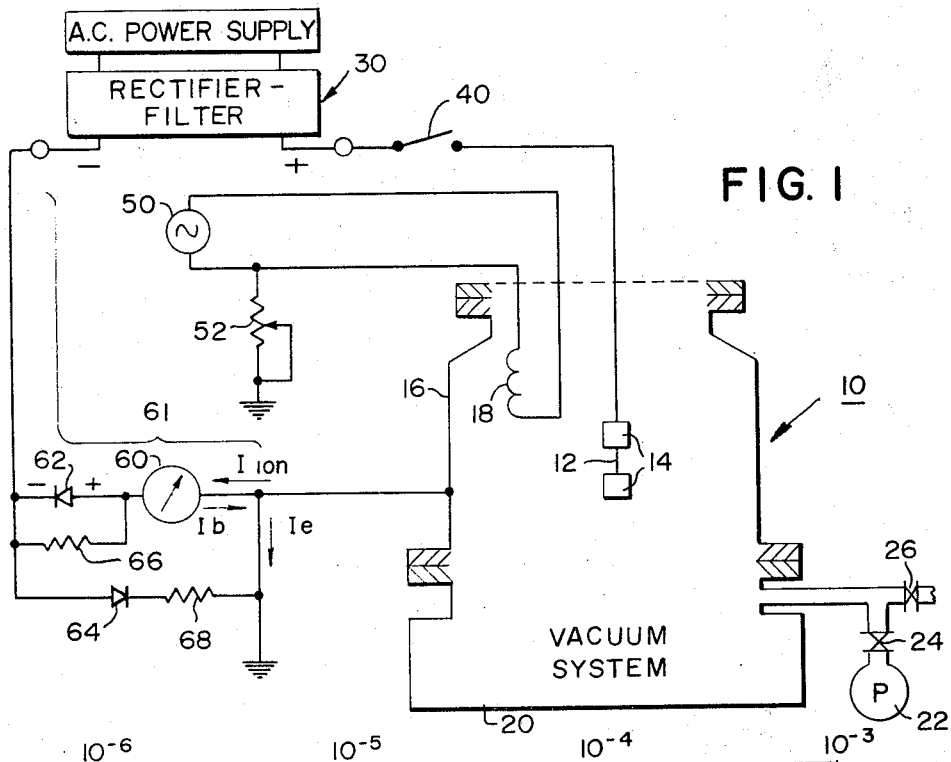
Figure 2:
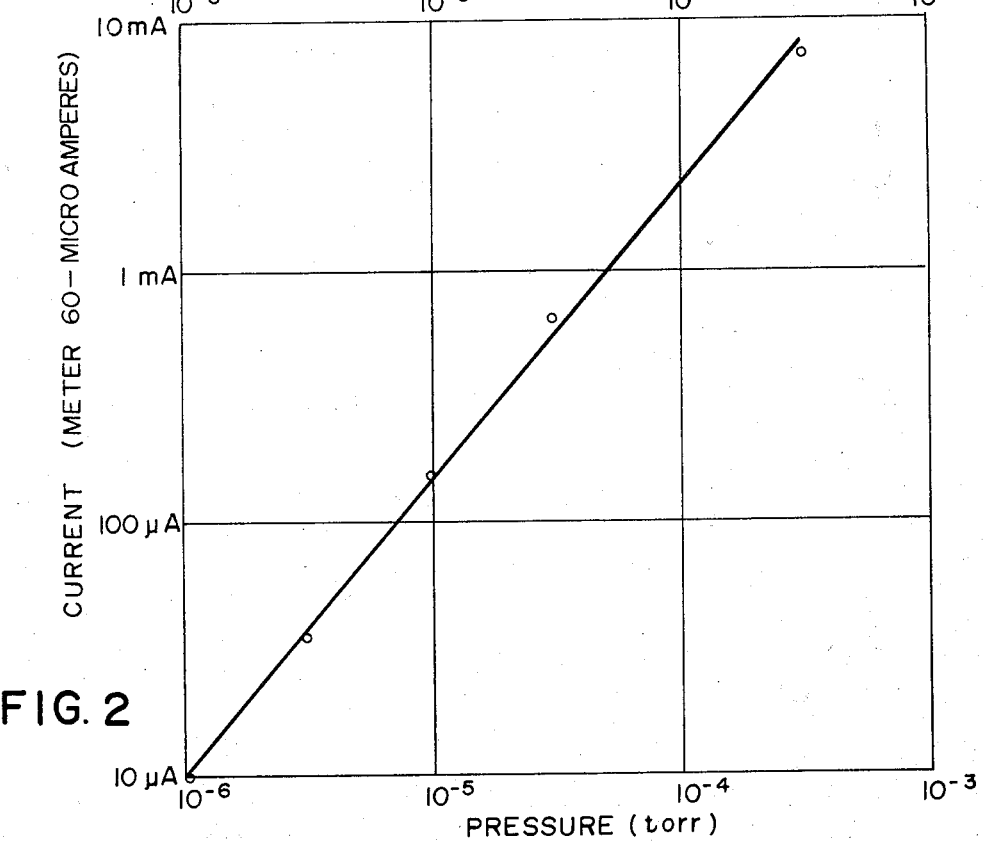

The invention is now described more specifically with reference to the accompanying drawings in which FIG. 1 is a schematic diagram of the improved orbitron power supply apparatus of the present invention and FIG. 2 is a calibration curve plotted on a log-log scale.

The orbitron pump is indicated at 10 and comprises the usual elements—a central anode rod 12 with slugs 14 of getter material mounted thereon, a grounded metal pump body 16 serving as cathode and as an electron source, shielded filament 18. The pump is connected to a vacuum system 20 such as a coater or furnace. Also included in the system are a roughing pump 22, with a cut-off valve 24, and a valve 26 for backfilling the evacuated system with air or inert gas as desired. Details of the pump construction and suitable alternatives and similar pumps are described in the Herb and Pauly and Herb references.

The power supply of the pump is represented by a power supply 30 and a switch 40. In practice the power supply would comprise an industrial alternating current source, autotransformer, transformer and filter and rectifier circuit. An alternating current supply 50 is provided for the filament(s) 18 and a variable resistor 52 is provided for adjusting filament bias.

Orbitron pumps are operated with an anode voltage of about 1,000 volts or more. A radial electric field is set up between the anode and grounded cathode. Electrons emitted from the filament are caused to orbit aronud the anode by the field and during this oscillation, they have a high probability of colliding with gas molecules to ionize the gas molecules. Positive ions formed by the collisions are drawn to the wall. Some of the orbiting electrons and some of the electrons produced in collisions are also captured by the wall. Electrons are also secondarily emitted from the wall due to ion or X-ray import on the wall. The electron current flowing in wire 161 at any given time is the sum of these various currents. That is, at any given instant, there is a component of current in 161 which is derived from ions arriving at the wall 16, a component derived from electron arrival and a noise component due to secondary emission. The ion derived current component varies as a function of gas pressure; the electron derived current component is independent of pressure. The prior art workers recognize that the ion derived current is much larger than the electron derived current at relatively high pressures (e.g., $10^{-3}$ torr), but that the ion derived current is about equal to or less than the electron derived current at lower pressures (around $10^{-5}$ torr). Indeed the current in wire 161 changes direction as pressure drops. The prior art workers have therebefore concluded that pressure measurements cannot be made from a grounded cathode at these lower pressures.

In accord with the present invention a microammeter 60 is provided between the negative terminal of the power supply and the grounded pump cathode, thus floating the power supply. A diode 62 is mounted in series with the meter in a direction to allow pump ion derived current (I ion) to pass through the meter and a diode 64 is mounted in parallel with the microammeter 60 and diode 62 in a direction to allow pump electron derived currents (Ie) to shunt the meter. A resistor 66 is mounted across diode 62 to pass a current (Ib) which is effective to buck out secondary electron currents at the cathode derived from X-ray, ion and photon impact at the cathode (all collectively referred to herein as X-ray derived currents).

The apparatus of the present invention is based on the concept that the electron derived and ion derived currents (the latter including X-ray derived current "noise") arrive at the wall 16 of the pump in alternate bursts to some extent and the further realization that these alternate bursts may be used to separate electron and ion currents to get at the pressure dependent ion current at low pressures (on the order of $1 \times 10^{-5}$ torr and below). The reason for the alternate pulsating bursts of ions and electrons (or more accurately pulsating bursts of higher and lower components of ion derived current) which make possible the unique low pressure measurement of the present invention is not entirely understood. It is at least in part due to the fact that even the best practical rectifier and filter supplies of the art must result in some pulsing of the high voltage between anode 12 and cathode 14. This field modulation affects the ion current and electron current reaching the pump cathode in different ways because of their opposite charge. Thus while fewer electrons strike the wall at high field strength (anode potential), more ions do, and vice versa at low anode potential. This modulation of wall current can be observed on a cathode ray oscilloscope. In an oscillating electron type of pump, such as the orbitron, these voltage pulses will modulate the ratio of ion current to electron current reaching the pump wall during the wavelength of the pulse. This yields recognizably different currents which are, in effect, separate ion and electron currents for purposes of meter response. With the addition of the current demodulating circuit elements 62 and 64, the ion current can be read by microammeter 60 at low pressures down to the X-ray limit of the device (and even further with compensating element 66). The D.C. microammeter integrates the pulsed increases in ion current.

The circuit elements used for 62, 64 and 66 are all commercially available. Preferably diodes 62 and 64 are selected to tolerate forward currents up to 100 milliamperes and a peak reverse voltage of 50 volts. The size of resistor 66 for bucking out X-ray current is determined by varying the resistance and observing the ion current reading until the departure of the calibration curve from linear is bucked out. A 1.8 K. resistor has been found to accomplish this for a 2-inch diameter orbitron pump operated at 6,000 volts anode-cathode, 225 volts filament bias, 28 milliamperes emission current. In cross-checking with a Bayard-Alpert gauge, the reading of microammeter 60 followed pressure in linear fashion as shown by the curve of FIG. 2. In larger pump sizes, there will be even more surface area and therefore a more sensitive reading of ion current will be available to allow reading down into the $10^{-7}$ torr pressure range and below. Larger X-ray currents will also be generated in larger pumps and a smaller resistor 66 may be necessary for adequate buck-out current.

Several modifications can be made within the scope of the present invention. For instance, temperature stability of the gauging circuit can be assured by adding a resistor in series with diode 64 as shown at 68. The resistor 68 generally has the same magnitude as resistor 66. But this varies with the temperature stability requirement of the circuit involved. The general design procedure is to select a resistor which increases the forward voltage drop across diode 64 by about an order of magnitude (ten times) or more to swamp the temperature derived drift in voltage drop. Several alternative circuit arrangements can be made based on the principles of the present invention. For instance, instead of using rectifiers, the demodulation can be accomplished by using a vibrator switch or chopper synchronized with the ripple in pump field and connecting the instrument to the wall and power supply during ion peaks. Also, the inherent modulation of pump electrical field by an A.C. ripple in the anode voltage supply can be supplemented or replaced by modulation of the field through modulation of filament bias or heater current (although these constitute less preferred species). Another way of modulating the electric field in the pump is by applying a mechanical or electronic vibrator in series with the high voltage anode supply and anode. If modulating vibrations or choppers are applied to both voltage and a meter circuits, the vibrators should be synchronized.

What is claimed is:
1. An improved power supply for oscillating electron vacuum ionization devices such as orbitron vacuum pumps and the like having a metal wall cathode and being subject to small instabilities in the electron oscillation, the power supply comprising:
(a) bias means with positive and negative terminals for supplying a high voltage positive bias to the anode of the device in excess of about 1,000 volts;
(b) means for supplying current to the pump electron source;
(c) means for grounding the pump cathode and power supply; and
(d) means for isolating at least a portion of the power supply from ground and comprising a microampere current sensitive electrical instrument connected between the pump wall and negative terminal of the said bias means (a) and further comprising a first rectifying means in series with said instrument and a second rectifying means in parallel with said instrument, the said rectifying means being constructed and arranged to pass positive ion currents at the pump wall to the instrument and to shunt electron currents at the wall around the instrument,
whereby the instrument produces an output signal varying as a known function of pressure in the device down to the X-ray limit of the device.
2. The power supply of claim 1 further comprising:
(e) means for compensating the noise produced by X-radiation within the device,
whereby the known pressure response of the instrument is extended to a lower pressure level.
3. In combination, (a) an orbitron vacuum device with an annular metal cathode, a central anode, (b) means for maintaining an electric field between the anode and cathode and injecting electrons into the field to orbit about the anode and ionize gas molecules within the annular cathode by electron collision, (c) the said means (b) modulating the electric field so that peak ion and electron currents alternately arrive at the cathode in cyclic fashion, (d) a current responsive electric instrument connected to the cathode and (e) demodulating means for routing peak ion derived currents to the instrument and blocking said peak electron derived currents at low pressure.
4. The apparatus of claim 3 wherein said instrument comprises a D.C. miroammeter.
5. The apparatus of claim 4 wherein the demodulating means comprises first and second rectifying means connected in series and parallel with the meter and in opposite polarities with respect to each other.
6. The apparatus of claim 5 further comprising compensating means for balancing, at least in part, secondary X-ray derived electron current.

References Cited
UNITED STATES PATENTS

| | | | |
|---|---|---|---|
| 1,334,143 | 3/1920 | Dushman | 324—33 |
| 1,372,798 | 3/1921 | Buckley | 324—33 |
| 2,993,638 | 7/1961 | Hall et al. | |
| 3,244,969 | 5/1966 | Herb et al. | 324—33 |

RUDOLPH V. ROLINEC, *Primary Examiner.*

C. F. ROBERTS, *Assistant Examiner.*